(12) United States Patent
Wang et al.

(10) Patent No.: US 9,814,023 B2
(45) Date of Patent: Nov. 7, 2017

(54) METHOD FOR SENDING AND RECEIVING SYSTEM INFORMATION, BASE STATION, AND USER EQUIPMENT

(71) Applicant: SHARP KABUSHIKI KAISHA, Osaka-shi, Osaka (JP)

(72) Inventors: Feng Wang, Shanghai (CN); Renmao Liu, Shanghai (CN); Ming Ding, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 21 days.

(21) Appl. No.: 14/655,634

(22) PCT Filed: Dec. 27, 2013

(86) PCT No.: PCT/CN2013/090630
§ 371 (c)(1),
(2) Date: Jun. 25, 2015

(87) PCT Pub. No.: WO2014/101810
PCT Pub. Date: Jul. 3, 2014

(65) Prior Publication Data
US 2015/0341908 A1    Nov. 26, 2015

(30) Foreign Application Priority Data
Dec. 27, 2012    (CN) .......................... 2012 1 0580308

(51) Int. Cl.
*H04W 72/02*    (2009.01)
*H04L 5/00*    (2006.01)
(Continued)

(52) U.S. Cl.
CPC .............. *H04W 72/02* (2013.01); *H04J 1/12* (2013.01); *H04L 5/0023* (2013.01);
(Continued)

(58) Field of Classification Search
None
See application file for complete search history.

(56) References Cited

U.S. PATENT DOCUMENTS

2009/0176463 A1    7/2009    Raaf et al.
2011/0235743 A1    9/2011    Lee et al.
(Continued)

FOREIGN PATENT DOCUMENTS

CN        102823168 A      12/2012
JP        2011-512055 A    4/2011
(Continued)

*Primary Examiner* — Diane Lo
(74) *Attorney, Agent, or Firm* — Birch, Stewart, Kolasch & Birch, LLP (57) ABSTRACT

The present invention provides a method carried out by a base station, including: a step (S320) of generating a code sequence containing system information of the base station; a step (S330) generating, by modulating the code sequence, a physical broadcast channel (PBCH) sequence including a distributed PRB frequency division multiplexing format or a centralized PRB frequency division multiplexing format; a step (S340) of selecting a physical resource block (PRB) for a PBCH contained in the PBCH sequence; and a step (S350) of carrying out mapping between the PBCH and a resource element (RE) in the PRB thus selected. The present invention also provides (i) a method carried out by a user equipment, (ii) a corresponding base station, and (iii) the corresponding user equipment. According to the present invention, it is possible to increase energy use efficiency of an LTE-Advanced system, improve spectral efficiency, and reduce inter-cell collision of time/frequency resources.

8 Claims, 10 Drawing Sheets

(51) Int. Cl.
*H04J 1/12* (2006.01)
*H04B 1/707* (2011.01)

(52) U.S. Cl.
CPC .......... H04L 5/0026 (2013.01); H04L 5/0053 (2013.01); H04L 5/0092 (2013.01); *H04B 1/707* (2013.01); *H04L 5/0048* (2013.01); *H04L 5/0073* (2013.01)

(56) References Cited

U.S. PATENT DOCUMENTS

| | | | |
|---|---|---|---|
| 2011/0274102 A1 | 11/2011 | Kim et al. | |
| 2012/0198305 A1* | 8/2012 | Abu-Surra | H03M 13/116 714/758 |
| 2013/0051373 A1* | 2/2013 | Ro | H04W 56/00 370/336 |
| 2013/0077582 A1* | 3/2013 | Kim | H04W 74/006 370/329 |
| 2013/0089067 A1* | 4/2013 | Ji | H04W 56/00 370/330 |
| 2013/0250878 A1* | 9/2013 | Sayana | H04W 4/005 370/329 |
| 2014/0036747 A1* | 2/2014 | Nory | H04W 72/0406 370/311 |
| 2014/0071934 A1* | 3/2014 | Frenne | H04L 5/001 370/330 |
| 2014/0086173 A1* | 3/2014 | Sadeghi | H04L 5/005 370/329 |
| 2014/0192786 A1* | 7/2014 | Skov | H04W 74/0833 370/336 |
| 2014/0348077 A1* | 11/2014 | Chen | H04W 72/12 370/329 |
| 2015/0036653 A1* | 2/2015 | Kim | H04L 5/0025 370/330 |
| 2015/0237602 A1* | 8/2015 | Chae | H04B 7/08 370/329 |

FOREIGN PATENT DOCUMENTS

| | | |
|---|---|---|
| WO | WO 2011/119005 A2 | 9/2011 |
| WO | WO 2014/052412 A2 | 4/2014 |

* cited by examiner

METHOD FOR SENDING AND RECEIVING SYSTEM INFORMATION, BASE STATION, AND USER EQUIPMENT

TECHNICAL FIELD

The present invention relates to a technical field of mobile communication. More specifically, the present invention relates to (i) a method of transmitting and receiving system information, (ii) a base station, and (iii) user equipment.

BACKGROUND ART

The Long Term Evolution (LTE) developed by the 3rd Generation mobile communication Partnership Project (3GPP) is intended to provide increasingly diversified mobile services, and encompasses a packetizing voice communication standard. The first edition (i.e. Release 8) of the LTE by the 3GPP employs the orthogonal frequency-division multiple access (OFDMA) technology and the multiple-antenna (MIMO) technology. In addition, Release 10 developed by the 3GPP has been evaluated and measured by the International Telecommunication Union, and has then been officially designated as a 4th generation global mobile communication standard; LTE-Advanced. The LTE-Advanced standard employs carrier aggregation (CA) and a relay technology. This has realized the enhancement of uplink/downlink MIMO technology and support for Het-Net setting.

For increase in energy use efficiency of an LTE-Advanced system and for improvement in spectral efficiency, the 3GPP has decided to introduce a new carrier type (NCT) into the current edition (Release 11) of LTE. The introduction will be carried out mainly in two stages. In the first stage, NCT is normalized mainly by synchronizing carriers within a CA frame and by reducing cell-specific reference signals (CRS) and control channels in the NCT. In the second stage, NCT processing in a stand-alone mode is realized. Specifically, a mobile communication service and data processing are provided while only a NCT carrier is present with respect to one or a plurality of service cells in a cellular system.

The NCT processing during the stand-alone mode mainly relates to (i) a broadcast mechanism of system information on a service cell, (ii) acquisition of a common search space (CSS) of an enhanced physical downlink control channel (ePDCCH), and support for user equipment (UE) mobility. Furthermore, it is necessary to consider also other functions of future LTE, such as Coordinated Multipoint (CoMP).

SUMMARY OF INVENTION

Technical Problem

In view of a current status and future vision of NCT, it is expected that a cell-specific reference signal CRS for signal demodulation will not be used. However, according to the current broadcast mechanism based on LTE, demodulation based on a CRS is employed, such as the cases of a physical broadcast channel (PBCH) and a physical downlink control channel (PDCCH). This poses such an urgent problem as realizing broadcasting of system information during a stand-alone mode without using a demodulation function which is based on a CRS.

Under the circumstances, there is considered an intuitive method of solving the problem, which method is based on a demodulation reference signal (DMRS) of the current LTE. However, the original purpose of introducing DMRS into LTE was to designate the DMRS as a user-specific (UE-Specific) reference signal. Specifically, one-by-one demodulation of physical resource blocks (PRB) is realized by employing a pre-coding format with respect to corresponding to user data and reference signals so that frequency division multiplexing can be applied. However, according to current time division multiplexing of PBCH, demodulation in accordance with DMRS is not applied. This is because, in a case where all of DMRS ports are used for demodulation of a PBCH, there is a decrease in flexibility of transmission mode of a physical downlink sharing channel (PDSCH) in time division multiplexing of the PBCH.

Solution to Problem

In order to solve the problem, the present invention provides a mechanism of transmitting and receiving system information of a service cell. The present invention provides a mechanism in which (i) a base station transmits the system information of the service cell during an NCT stand-alone mode and (ii) a UE can obtain the system information. In addition, with the present invention, it is possible to reduce inter-cell collision of time/frequency resources by re-designing PBCH in accordance with a demodulation function of DMRS.

According to as aspect of the present invention, the present invention provides a method carried out by a base station, comprising the steps of: (a) generating a code sequence containing system information of the base station; (b) generating a physical broadcast channel PBCH sequence by modulating the code sequence; (c) selecting a physical resource block PRB for a PBCH contained in the PBCH sequence; and (d) carrying out mapping between the PBCH and a resource element RE in the PRB thus selected, the PRB including a distributed PRB frequency division multiplexing format or a centralized PRB frequency division multiplexing format.

The PRB with respect to the PBCH is preferably selected in accordance with an identifier of the base station and with an index of the PBCH contained in the PBCH sequence.

2 PRBs for the PBCH from 6 PRBs located at a center part of a system frequency domain of a subframe are preferably selected.

An index of the PBCH contained in the PBCH sequence contains information concerning endmost 2 bits of a system frame number SFN.

In a case where mapping is carried out between a PBCH and a RE in the PRB selected, none of a RE for a PBCH demodulation reference signal, a RE for a sync signal, and a RE for a time/frequency tracking reference signal is preferably used as the RE for the PBCH.

The method is preferably configured to further include the step of: transmitting a PBCH sequence by use of radiation diversity or random beam forming.

According to another aspect of the present invention, the present invention provides a base station including: a code sequence generating section configured to generate a code sequence containing system information of the base station; a physical broadcast channel PBCH sequence generating section configured to generate a PBCH sequence by modulating the code sequence; a physical resource block PRB selecting section configured to select a PRB for a PBCH contained in the PBCH sequence; and a mapping section configured to carry out mapping between the PBCH and a resource element RE in the PRB thus selected, the PRB includes a distributed PRB frequency division multiplexing format or a centralized PRB frequency division multiplexing format.

The PRB selecting section is preferably configured to select the PRB with respect to the PBCH in accordance with an identifier of the base station and with an index of the PBCH contained in the PBCH sequence.

The PRB selecting section is preferably configured to select 2 PRBs for the PBCH from 6 PRBs located at a center part of a system frequency domain of a subframe.

An index of the PBCH contained in the PBCH sequence preferably contains information concerning endmost 2 bits of a system frame number SFN.

In a case the mapping section carries out mapping between a PBCH and a RE in the PRB selected, the mapping section is preferably configured to use, as the RE for the PBCH, none of a RE for a PBCH demodulation reference signal, a RE for a sync signal, and a RE for a time/frequency tracking reference signal.

The base station is preferably configured to further include a transmitting section configured to transmit a PBCH sequence by use of radiation diversity or random beam forming.

According to another aspect of the present invention, the present invention provides method carried out by a user equipment, including the steps of: (a) obtaining a physical layer identifier of a service cell to which the user equipment corresponds; (b) reading, in accordance with the physical layer identifier thus obtained, a physical resource block PRB corresponding to a physical broadcast channel PBCH; (c) obtaining a PBCH sequence by carrying out demodulation with use of a demodulation reference signal DMRS; and (d) obtaining system information of a service cell by decoding a bit contained in the PBCH sequence, the PRB including a distributed PRB frequency division multiplexing format or a centralized PRB frequency division multiplexing format.

The PRB corresponding to the PBCH preferably includes 2 PRBs of 6 PRBs located at a center part of a system frequency domain of a subframe.

A resource element RE for the PBCH is preferably different from each of a RE for a PBCH demodulation reference signal, a RE for a sync signal, and a RE for a time/frequency tracking reference signal.

The demodulating step preferably includes a step of carrying out demodulation by use of a combination of DMRSs of differing PRBs with respect to the centralized PRB frequency division multiplexing format.

According to another aspect of the present invention, the present invention provides user equipment including: a cell identifier obtaining section configured to obtain a physical layer identifier of a current service cell to which the user equipment corresponds; a physical resource block PRB reading section configured to read, in accordance with the physical layer identifier thus obtained, a PRB corresponding to a physical broadcast channel PBCH; a demodulating section configured to obtain a PBCH sequence by carrying out demodulation with use of a demodulation reference signal DMRS; and a decoding section configured to obtain system information of the service cell by decoding a bit contained in the PBCH sequence, the PRB including a distributed PRB frequency division multiplexing format or a centralized PRB frequency division multiplexing format.

The PRB reading section is preferably configured to read 2 PRBs of 6 PRBs located at a center part of a system frequency domain of a subframe.

The PRB reading section is preferably configured to carry out reading with respect to a RE which is different from each of a RE for a PBCH demodulation reference signal, a RE for a sync signal, and a RE for a time/frequency tracking reference signal.

The demodulating section is preferably configured to carry out demodulation by use of a combination of DMRSs of differing PRBs with respect to the centralized PRB frequency division multiplexing format.

Advantageous Effects of Invention

According to the present invention, it is possible to increase energy use efficiency of an LTE-Advanced system, improve spectral efficiency, and reduce inter-cell collision of time/frequency resources.

DESCRIPTION OF EMBODIMENTS

The above-described features and other features of the present invention will be made clear by the detailed description below with reference to the drawings.

The following description will provide, with reference to the drawings and specific examples, a detailed description of (i) a method of transmitting/receiving system information with respect to NCT during a stand-alone mode, (ii) a base station, and (iii) a user equipment (UE), each of which is in accordance with the present invention. Note that the present invention is not limited to the specific examples described below. Note also that in order to avoid confusing the understanding of the present invention, a common technique, which is not directly related to the present invention, will not be described in detail.

Several examples of the present invention will be described in detail below by using, as an example of an operational environment, an LTE mobile communication system and subsequent evolution editions. Note, however, that the present invention is not limited to the examples below, but can be applied to a large number of other wireless communication systems such as a future 5G cellular communication system.

Figure 1:
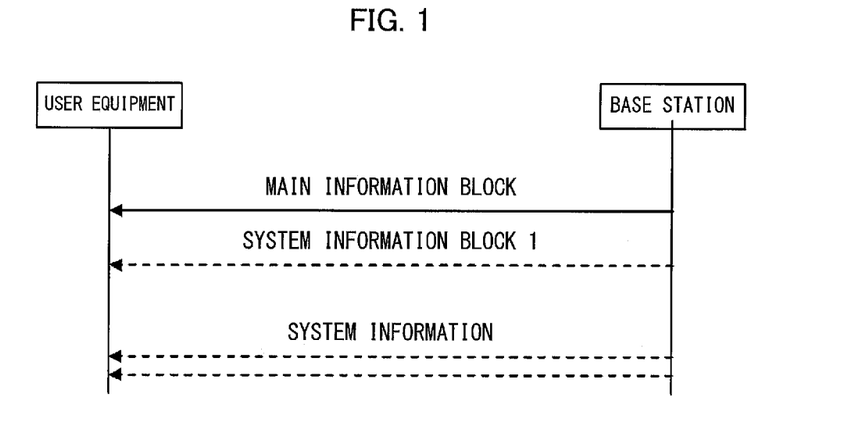
FIG. 1 is a view schematically illustrating a process of obtaining system information according to the conventional LTE standard.

First, a process of obtaining system information according to the conventional LTE system will be described with reference to FIG. 1. Specifically, according to the LTE cellular system, system information is classified into the following two types: (1) a main information block (MIB) which includes a system band, physical hybrid instructing channel (PHICH) setting, and a system frame number (SFN) and which is transmitted via a PBCH and (2) a system information block (SIB) which is multiplexed together with unicast data that is transmitted in a physical layer via a physical downlink sharing channel (PDSCH). When user equipment (UE) is started, a cell search is first carried out, and then a synchronization channel PSS/SSS is detected. This realizes fall time synchronization and frequency synchronization. Next, the UE obtains a type of cyclic prefix (CP) and a physical identifier (PCI) of a cell, and then reads a PBCH so as to obtain MIB information. After the UE obtains a system band, a SIB is obtained by searching for a PDCCH. Then, the UE is ready for later UE random access.

Figure 2:
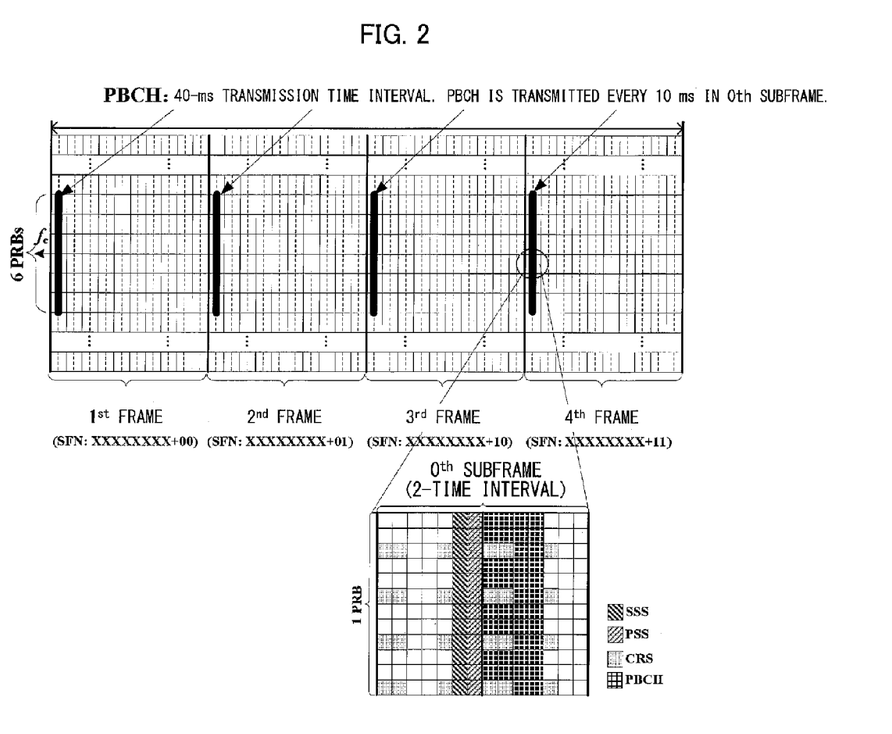
FIG. 2 is a view illustrating a configuration of a physical broadcast channel (PBCH) during a frequency division duplex (FDD) mode of a conventional LTE system.

FIG. 2 illustrates a configuration of a physical broadcast channel (PBCH) during an FDD mode of the conventional LTE system. In a case where the UE does not possess system band information which is detected in advance, the UE detects a system band in accordance with 72 subcarriers mapped as PBCH at a center part of an OFDM symbol (i.e. 6 PRBs located at the center part of a system frequency domain; these PRBs correspond to 1.08 MHz which is a lowest possible system band of the LTE). Note that MIB is constituted by 14 information bits and 10 blank (idle) bits. When a channel is to be encoded, 16 bits for cyclic redundancy check (CRC) are added to an end of the MIB, and convolutional encoding is carried out at a ⅓ bit rate. This is how 1920 bits in a case of a normal CP and 1728 bits in a case of an extended CP are obtained. Entire bits to be encoded are divided into 4 subgroups by repetitive encoding at a low bit rate. Each subgroup is self-decoded by its corresponding technique. Note that CRC of the MIB is carried out as follows: masking is carried out by use of a code which is indicative of a port number of a transmitting antenna, and the UE carries out blind detection, so that the port number of the antenna is obtained. In addition, in order to secure stable PBCH reception, time diversity and antenna diversity are employed. Specifically, the time diversity is carried out such that transmission time intervals (TTI) of 40 ms are used and that each MIB is transmitted to be distributed (any distributed part can be decoded) within the PBCH (fixed to $0^{th}$ subframe). On the other hand, the antenna diversity can be applied to a base station eNB and to the UE. In other words, the base station eNB having 2 or 4 antenna transmission ports transmits PBCH by use of a space-frequency block code (SFBC). A resource element (RE) group for the PBCH is independent of a port number of a transmitting antenna used by the eNB. In addition, since the PBCH does not use a RE that can be occupied by the cell-specific reference signal, it is unnecessary to consider the port number of the transmitting antenna actually used by the eNB. Note that information on the port number of the antenna is contained in a CRC mask of the MIB. In addition, since the MIB contains 8 bits at most as SFN information, information on the remaining 2 bits is collected from the TTI of 40 ms of the PBCH. In the TTI of 40 ms, a first wireless frame, a second wireless frame, a third wireless frame, and a fourth wireless frame are indicated by "00", "01", "10", and "11", respectively. As a modulation technique of the PBCH, QPSK is employed. Then, a downlink channel is evaluated for demodulation of PBCH data via the CRS. In a case where the UE accesses a cell by first reading out PBCH information, the UE can carry out blind decoding by employing another technique.

However, according to future LTE to be developed by the 3GPP, the following is true: In a case where NCT is set as a stand-alone mode, a reserved CRS is not used for demodulation of a channel but is used for tracking of tracking of time/frequency and for detection of a wireless resource. Therefore, a design for PBCH which is suitable for NCT during a stand-alone mode will be required.

Figure 3:
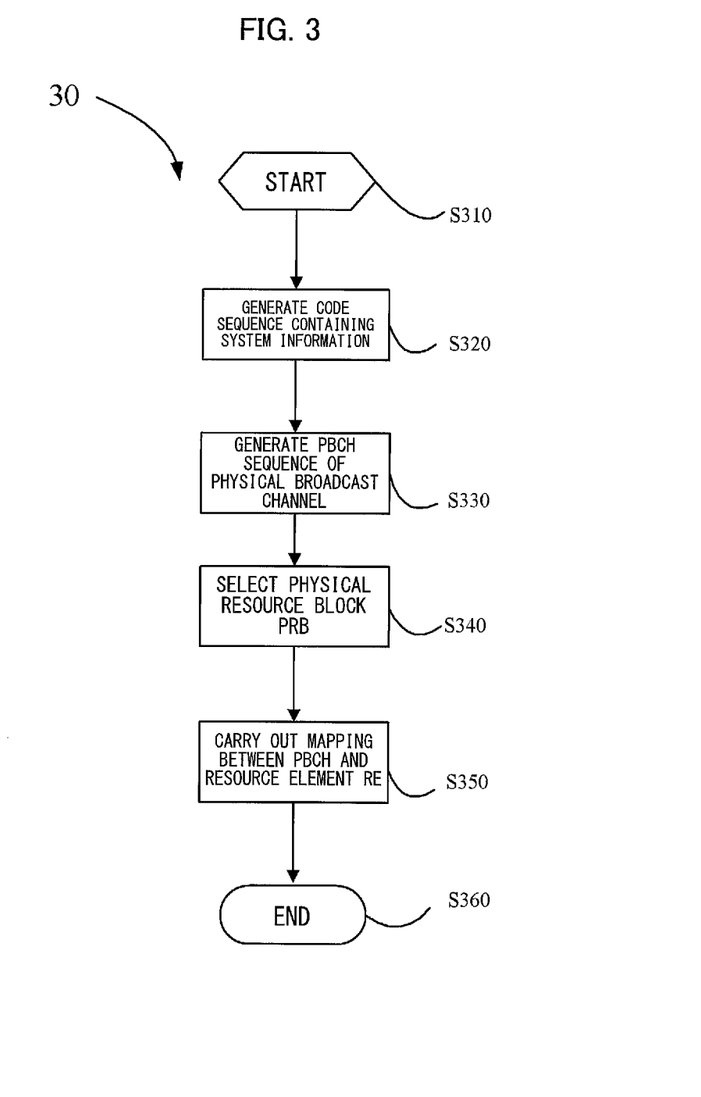
FIG. 3 is a flow chart illustrating a method employed by a base station in accordance with an example of the present invention.

FIG. 3 is a flow chart illustrating a method 30 employed by a base station in accordance with an example of the present invention. The method 30 can be carried out by a base station (eNB) of the LTE system. As illustrated in FIG. 3, the method 30 is started from a step S310.

In a step S320, a code sequence containing system information of the base station (service cell) is generated. Specifically, during a stand-alone mode, a main information block MIB of the base station, to which NCT is applied, is allowed to contain a most important information bit(s) and a predetermined blank bit(s). Then, a predetermined bit(s) for CRC is added. After convolutional encoding and bit rate matching, a code sequence having a certain length is generated.

In a step S330, the code sequence is modulated, so that a physical broadcast channel PBCH sequence is generated. For example, it is possible to (i) divide, into four independent self-decoding segments having an identical size, the code sequence generated in the step S320 and (ii) cause, by QPSK modulation, the four segments to be respective four PBCH sequences within the MIB transmission time intervals of the 40 ms. In such a case, transmission time intervals of PBCH are 10 ms.

In a step S340, a physical resource block PRB is selected for a PBCH contained in the PBCH sequence. According to the present invention, a PRB is selected for a corresponding PBCH in accordance with (i) an identifier of the base station eNB and (ii) an index of the PBCH. The eNB can employ a distributed PRB or a centralized PRB for containing a PBCH. Several examples of distributed and centralized PRBs will be described below.

<Distributed PRB Frequency Division Multiplexing>

In the present example, it is possible to use a distributed PRB frequency division multiplexing (FDM) format for a PBCH. 2 or more PRBs for PBCH transmission are selected from 6 PRBs located at a center part of a $0^{th}$ subframe. Note that transmission time intervals of the MIB are 40 ms, and that transmission intervals of the PBCH are 10 ms (i.e. a single transmission of the MIB is completed by continuously carrying out PBCH transmission four times). Preferably, 2 PRBs for PBCH transmission are selected from the 6 PRBs located at the center part of the $0^{th}$ subframe. In addition, a distributed PRB FDM format for a PBCH is based on a physical layer identifier PCI of a cell as follows:

$$N_{ID}^{cell} \qquad \text{[Math. 1]}$$

Figure 4A:
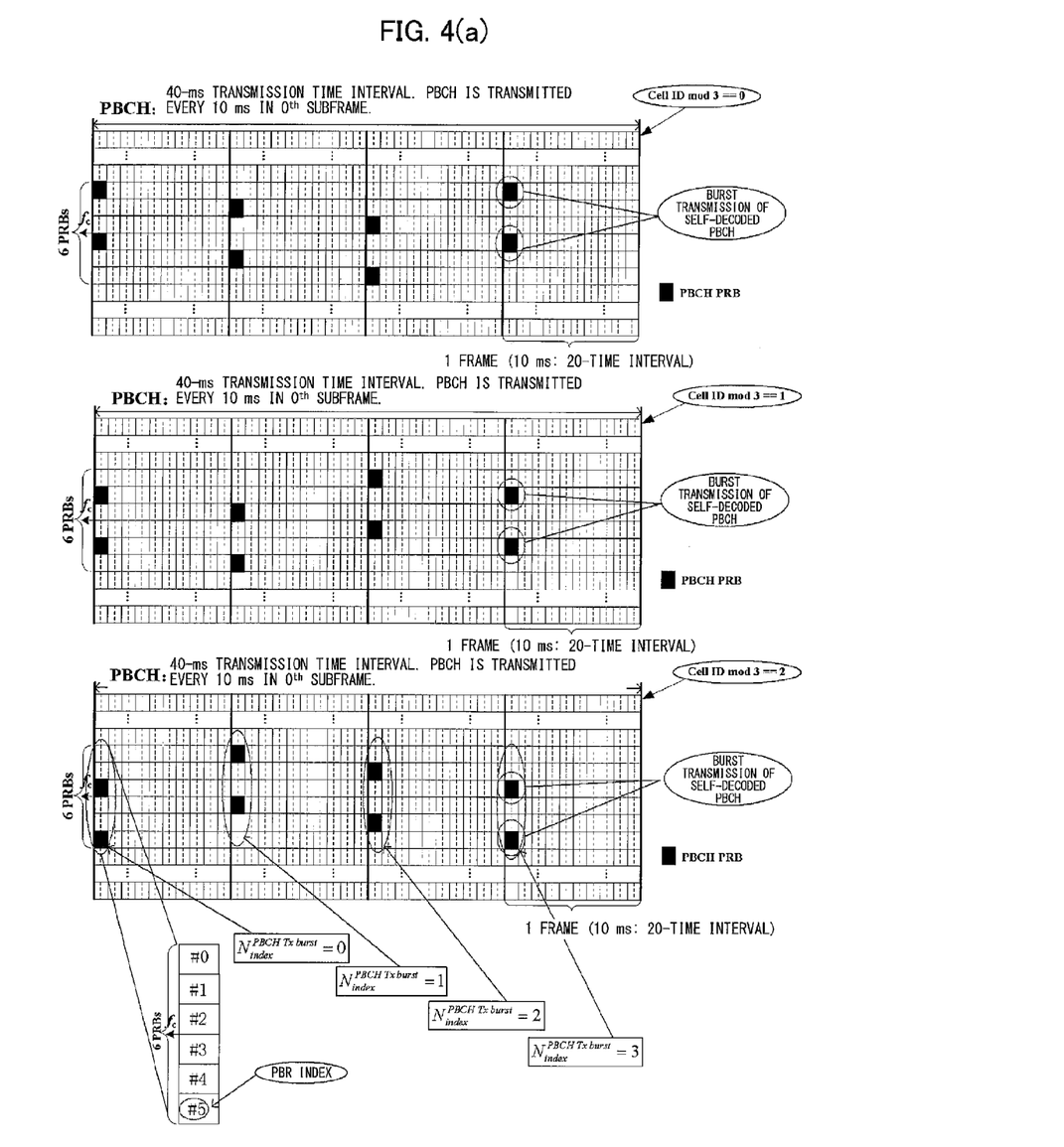
FIG. 4a is a view schematically illustrating distributed PBCH-PRB mapping in accordance with an example of the present invention.

FIG. 4(a) is a view schematically illustrating distributed PBCH-PRB mapping in accordance with the present example.

As illustrated in FIG. 4(a), in a case where 6 PRBs at the center part of $0^{th}$ subframes are removed, the following is true:

$$N_{index}^{PRB} \in \{0,1,2,3,4,5\} \qquad \text{[Math. 2]}$$

The eNB can set a serial number of PRBs for PBCH transmission based on $$N_{ID}^{cell}$$ [Math. 3]

That is, $$N_{index}^{PBCHTxburst}$$ [Math. 5]

in

[Math. 4]

$$N_{index}^{PRB} = (N_{ID}^{cell} \bmod 3 + 3m + N_{index}^{PBCHTxburst}) \bmod 6, \quad m = 0,1 \quad (1)$$

represents a transmission serial number corresponding to a PBCH transmitted within the 40-ms transmission time intervals of the MIB, and meets $$N_{index}^{PBCHTxburst} = 0,1,2,3$$ [Math. 6]

Figure 4B:
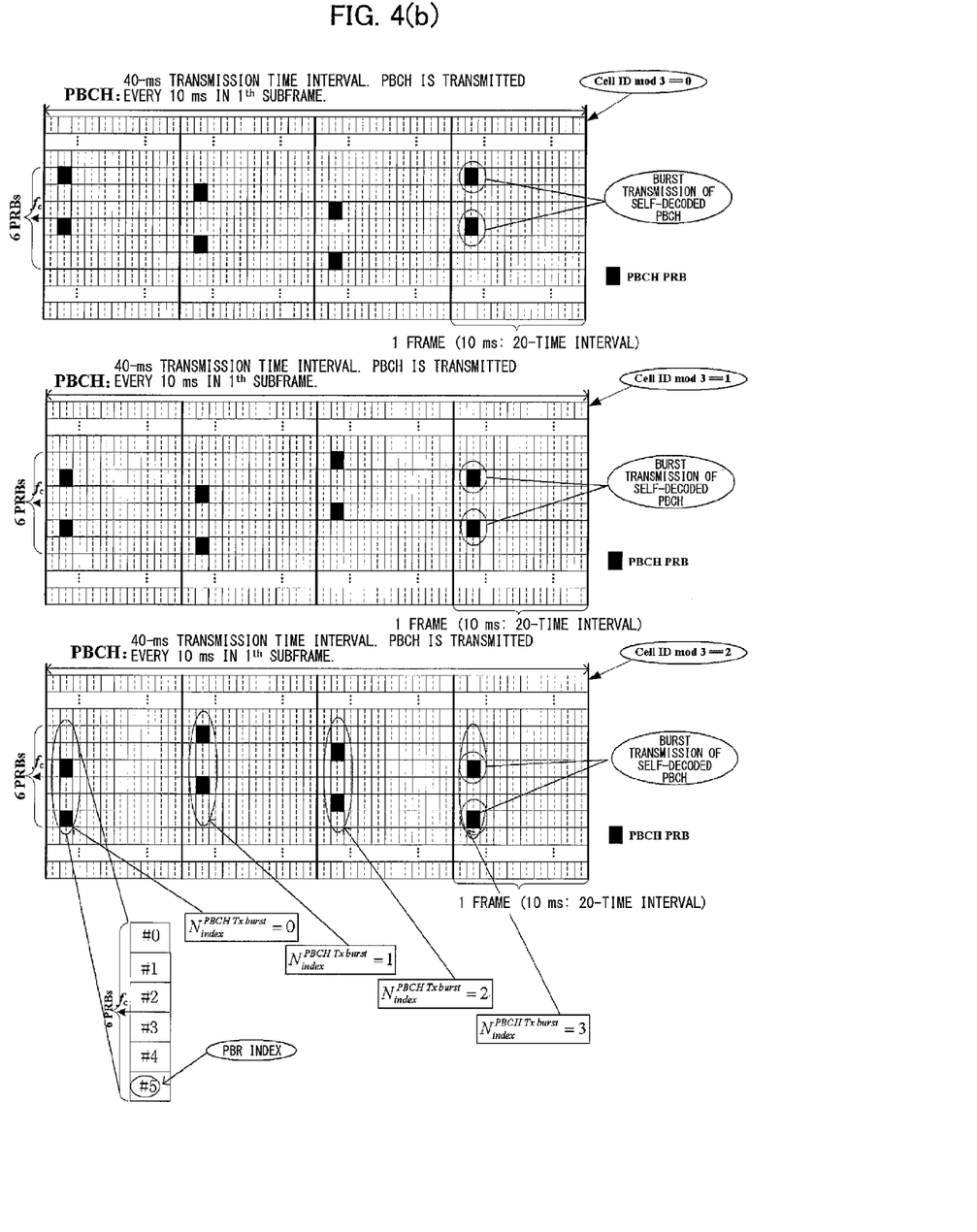
FIG. 4b is a view schematically illustrating distributed PBCH-PRB mapping in accordance with an example of the present invention.

Preferably, a PBCH can exist in subframe other than $0^{th}$ subframes. For example, a PBCH can exit in $1^{st}$ subframes as illustrated in FIG. 4(b). In such a case, it is possible to likewise set a serial number of PRBs for PBCH transmission in accordance with the above-described Formula (1).

<Centralized PRB Frequency Division Multiplexing>

Figure 5A:
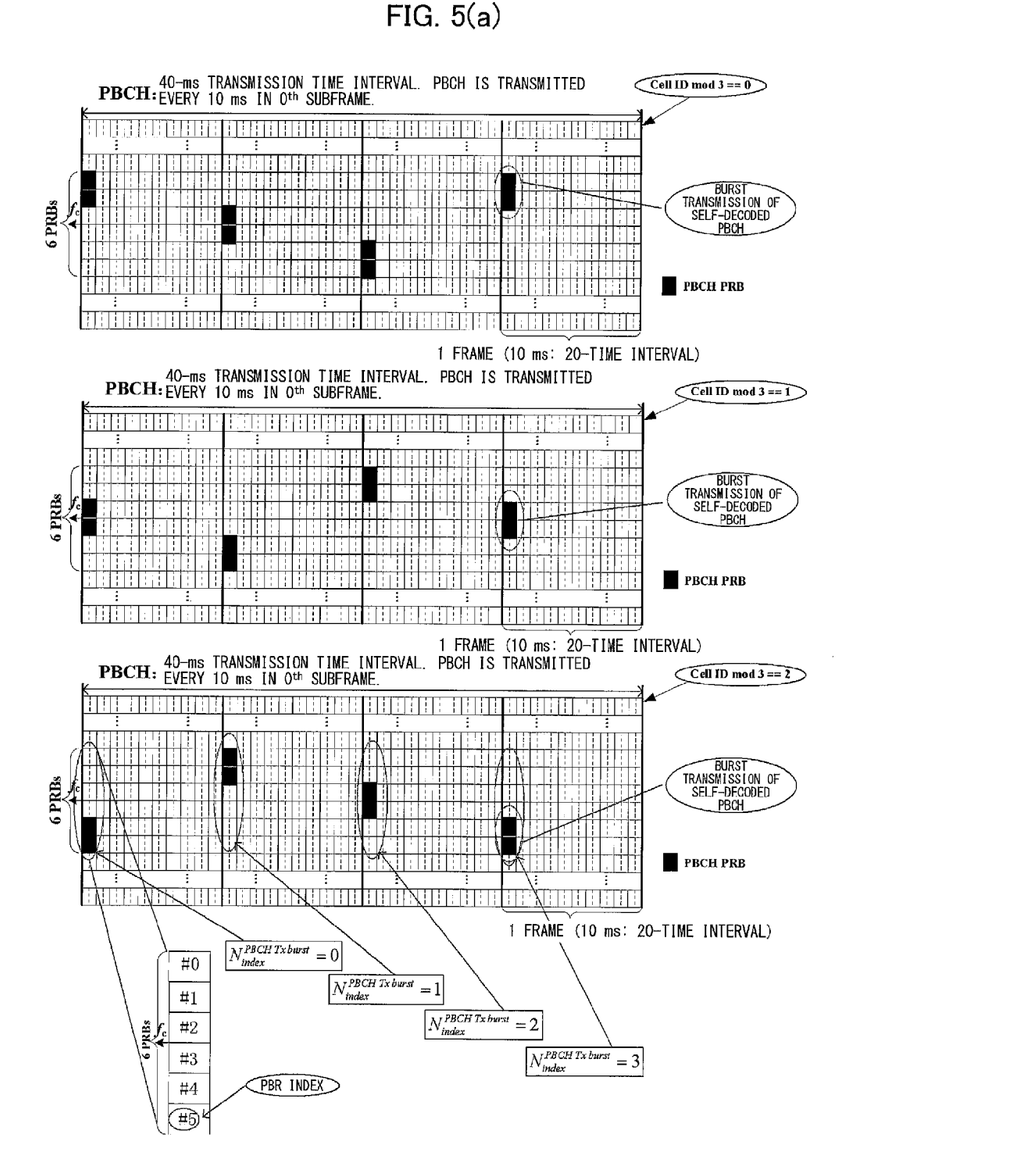
FIG. 5a is a view schematically illustrating centralized PBCH-PRB mapping in accordance with an example of the present invention.

In the present example, it is possible to use a centralized PRB frequency division multiplexing (FDM) format for a PBCH. 2 or more PRBs for PBCH transmission are selected from 6 PRBs located at a center part of a $0^{th}$ subframe. Note that transmission time intervals of the MIB are 40 ms, and that transmission intervals of the PBCH are 10 ms (i.e. a single transmission of the MIB is completed by continuously carrying out PBCH transmission four times). Preferably, 2 PRBs for PBCH transmission are selected from the 6 PRBs located at the center part of the $0^{th}$ subframe. In addition, it is possible to select centralized PRBs in accordance with $$N_{ID}^{cell}$$ [Math. 7]

which is a physical layer identifier of a cell. FIG. 5(a) is a view schematically illustrating centralized PBCH-PRB mapping.

As illustrated in FIG. 5(a), in a case where 6 PRBs at the center part of $0^{th}$ subframes are removed, the following is true:

$$N_{index}^{PRB} = \{0,1,2,3,4,5\}$$ [Math. 8]

The eNB can set a serial number of PRBs for PBCH transmission based on $$N_{ID}^{cell}$$ [Math. 9]

That is, $$N_{index}^{PBCHTxburst}$$ [Math. 11]

in

[Math. 10]

$$N_{index}^{PRB} = (2 \cdot (N_{ID}^{cell} \bmod 3) + m + 2 \cdot N_{index}^{PBCHTxburst}) \bmod 6, \quad m = 0,1 \quad (2)$$

represents a transmission serial number corresponding to a PBCH transmitted within the 40-ms transmission time intervals of the MIB, and meets $$N_{index}^{PBCHTxburst} = 0,1,2,3$$ [Math. 12]

Figure 5B:
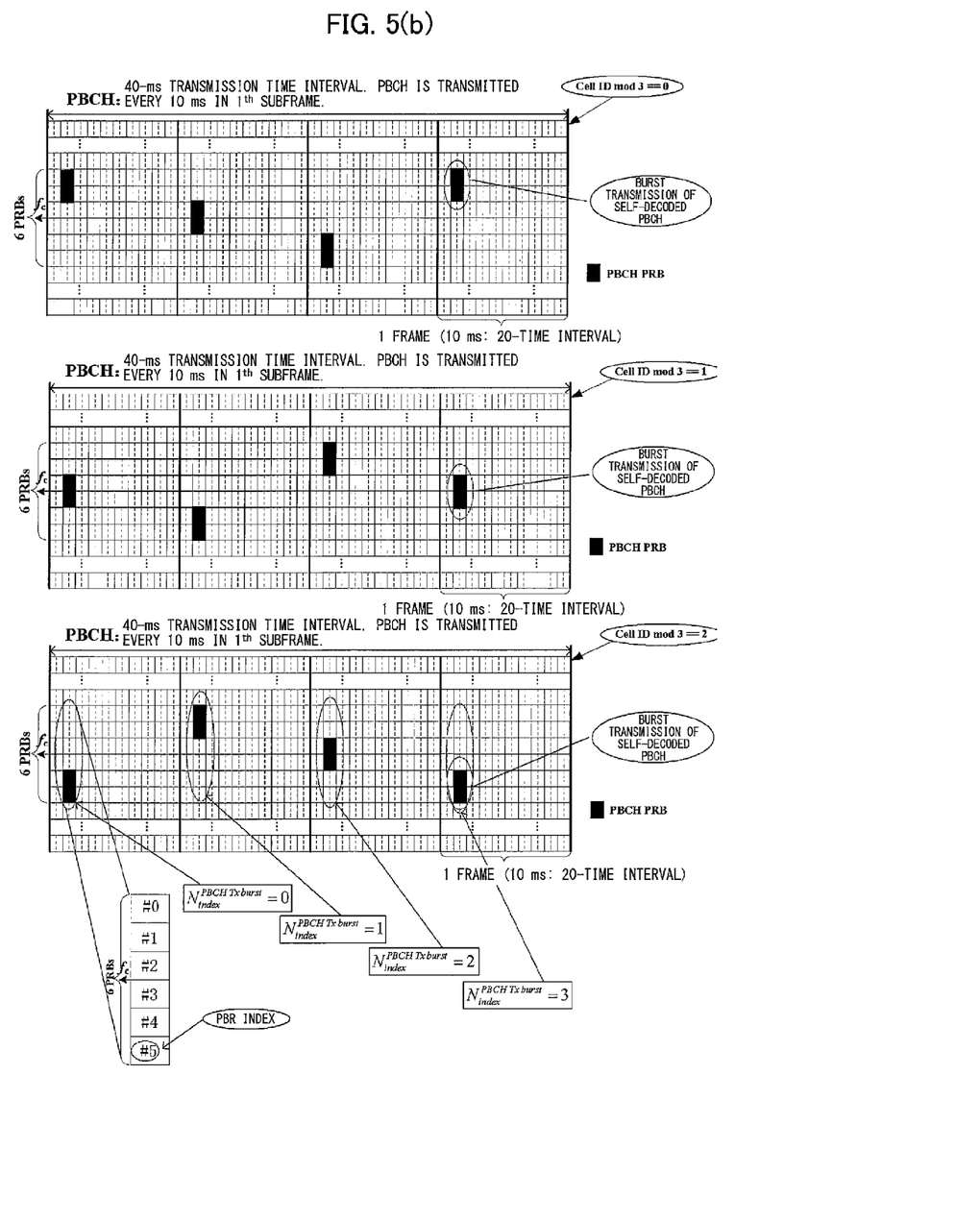
FIG. 5b is a view schematically illustrating centralized PBCH-PRB mapping in accordance with an example of the present invention.

Preferably, a PBCH can exist in subframe other than $0^{th}$ subframes. For example, a PBCH can exit in $1^{st}$ subframes as illustrated in FIG. 5(b). In such a case, it is possible to likewise set a serial number of PRBs for PBCH transmission in accordance with the above-described Formula (2).

In the case where any of the distributed PRB frequency division multiplexing and the centralized PRB frequency division multiplexing is employed, information concerning endmost 2 bits of a system frame number SFN is preferably contained in $$N_{index}^{PBCHTxburst}$$ [Math. 13]

which represents an order of PBCH in 40-ms transmission time intervals. That is, $$N_{index}^{PBCHTxburst} = 0$$ [Math. 14]

means SFN=xxxxxxxx00, $$N_{index}^{PBCHTxburst} = 1$$ [Math. 15]

means SFN=xxxxxxxx01, $$N_{index}^{PBCHTxburst} = 2$$ [Math. 16]

means SFN=xxxxxxxx10, and $$N_{index}^{PBCHTxburst} = 3$$ [Math. 17]

means SFN=xxxxxxxx11.

Next, in a step 350, mapping between a PBCH and a resource element RE in each of the selected PRBs is carried out. Note that it is possible to carry out corresponding layer mapping and corresponding pre-coding, and then to carry out RE mapping, so that allocation of a time/frequency resource of PBCH within a single MBI transmission time interval is completed. Preferably, in a case where mapping between a PBCH and a resource element RE in each of the selected PRBs is carried out, a RE for a PBCH demodulation reference signal DMRS, a RE for a sync signal PSS/SSS, and a RE for a time/frequency tracking reference signal do not need to be used as REs for a PBCH.

Figure 6:
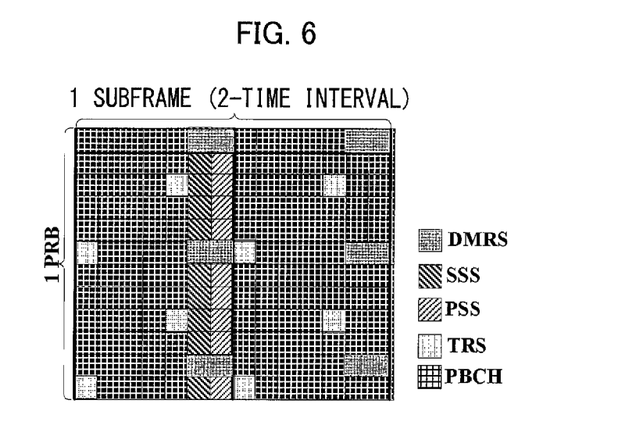
FIG. 6 is a view schematically illustrating RE mapping in PRB for PBCH transmission in accordance with an example of the present invention.

In addition, it is possible to demodulate a RE resource of a PBCH in accordance with channel prediction in cases where a DMRS antenna port AP=7 and the AP=8. FIG. 6 is a view schematically illustrating RE mapping within a PRB for PBCH transmission in accordance with an example of the present invention. Preferably, a PBCH can be realized by radiation diversity or random beam forming in accordance with the prediction where AP=7 and AP=8. It is also possible to carry out phase adjustment or the like of a demodulated signal of a PBCH by use of a reference signal of time/frequency tracking. Preferably, the UE can carry out demodulation of a PBCH by use of a combination of DMRSs of differing PRBs with respect to the centralized PRB frequency division multiplexing format is employed.

In addition, it is possible to carry out demodulation of a RE resource of a PBCH in accordance with channel prediction in cases where a DMRS antenna port AP=7, the AP=8, the AP=9, and the AP=10. In such a case, the PBCH can be realized by radiation diversity of four antennas or random beam forming Likewise, the UE can carry out demodulation of a PBCH by use of a combination of DMRSs of differing PRBs with respect to the centralized PRB frequency division multiplexing format is employed.

Finally, the method 30 ends in a step S360.

Figure 7:
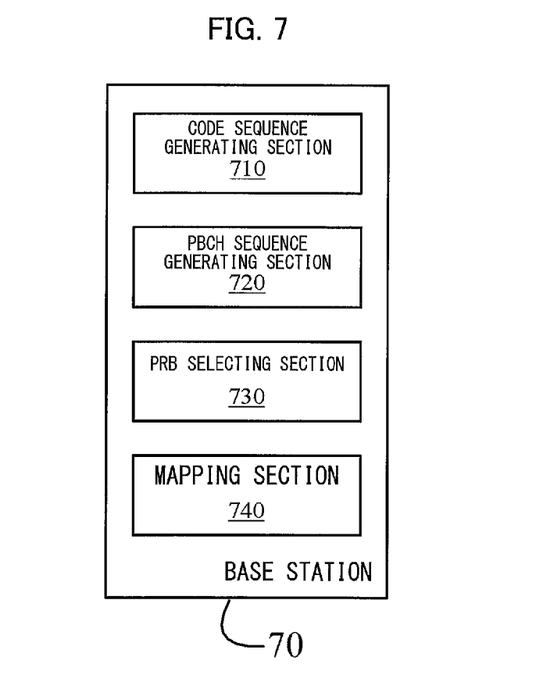
FIG. 7 is a block diagram illustrating a base station in accordance with an example of the present invention.

FIG. 7 is a block diagram illustrating a base station 70 in accordance with an example of the present invention. As illustrated in FIG. 7, the base station 70 includes a code sequence generating section 710, a physical broadcast channel PBCH sequence generating section 720, a physical resource block PRB selecting section 730, and a mapping section 740. Each of the components of the base station 70 will be described in detail below.

The code sequence generating section 710 is configured to generate a code sequence containing system information of the base station. Specifically, during a stand-alone mode, the code sequence generating section 710 causes a main information block MIB of the base station, to which NCT is applied, to contain (i) a most important information bit(s) and (ii) a predetermined blank bit(s). Then, the code sequence generating section 710 adds a predetermined bit(s) for CRC. After convolutional encoding and bit rate matching, the code sequence generating section 710 generates a code sequence having a certain length.

The PBCH sequence generating section 720 is configured to generate a PBCH sequence by modulating the code sequence generated by the code sequence generating section 710. For example, the PBCH sequence generating section 720 can (i) divide, into four independent self-decoding segments having an identical size, the code sequence generated by the code sequence generating section 710 and (ii) cause, by QPSK modulation, the four segments to be respective four PBCH sequences within the MIB transmission time intervals of the 40 ms. In such a case, transmission time intervals of PBCH are 10 ms.

The PRB selecting section 730 is configured to select a PRB for a PBCH contained in the PBCH sequence. According to the present invention, the physical resource block PRB selecting section 730 can select a PRB for a corresponding PBCH in accordance with (i) an identifier of the base station eNB and (ii) an index of the PBCH. In addition, it is possible to employ the above-described distributed PRB frequency division multiplexing format or the centralized PRB frequency division multiplexing format. The PRB selecting section 730 preferably selects 2 PRBs for PBCH transmission from 6 PRBs located at a center part of a subframe.

In the case where any of the distributed PRB frequency division multiplexing and the centralized PRB frequency division multiplexing is employed, information concerning endmost bits of a system frame number SFN is preferably contained in $$N_{index}^{PBCHTxburst}$$ [Math. 18]

which represents an order of PBCH in 40-ms transmission time intervals. That is, $$N_{index}^{PBCHTxburst}=0$$ [Math. 19]

means SFN=xxxxxxxx00, $$N_{index}^{PBCHTxburst}=1$$ [Math. 20]

means SFN=xxxxxxxx01, $$N_{index}^{PBCHTxburst}=2$$ [Math. 21]

means SFN=xxxxxxxx10, and $$N_{index}^{PBCHTxburst}=3$$ [Math. 22]

means SFN=xxxxxxxx11.

The mapping section 740 is configured to carrying out mapping between a PBCH and a resource element RE in each of the selected PRBs. For example, the mapping section 740 can carry out corresponding layer mapping and corresponding pre-coding, and then carry out RE mapping, so that allocation of a time/frequency resource of PBCH within a single MBI transmission time interval is completed.

Preferably, in a case where the mapping section 740 carries out mapping between a PBCH and a resource element RE in each of the selected PRBs, a RE for a PBCH demodulation reference signal DMRS, a RE for a sync signal PSS/SSS, and a RE for a time/frequency tracking reference signal do not need to be used as REs for a PBCH. In addition, it is possible to demodulate a RE resource of a PBCH in accordance with channel prediction in cases where a DMRS antenna port AP=7 and the AP=8. Alternatively, as described above, it is possible to carry out demodulation of a RE resource of a PBCH in accordance with channel prediction in cases where a DMRS antenna port AP=7, the AP=8, the AP=9, and the AP=10. In such a case, the PBCH can be realized by antenna radiation diversity or random beam forming. For example, the base station 70 can include another transmission means (not illustrated) configured to transmit a PBCH sequence by use of antenna radiation diversity or by use of random beam forming.

Figure 8:
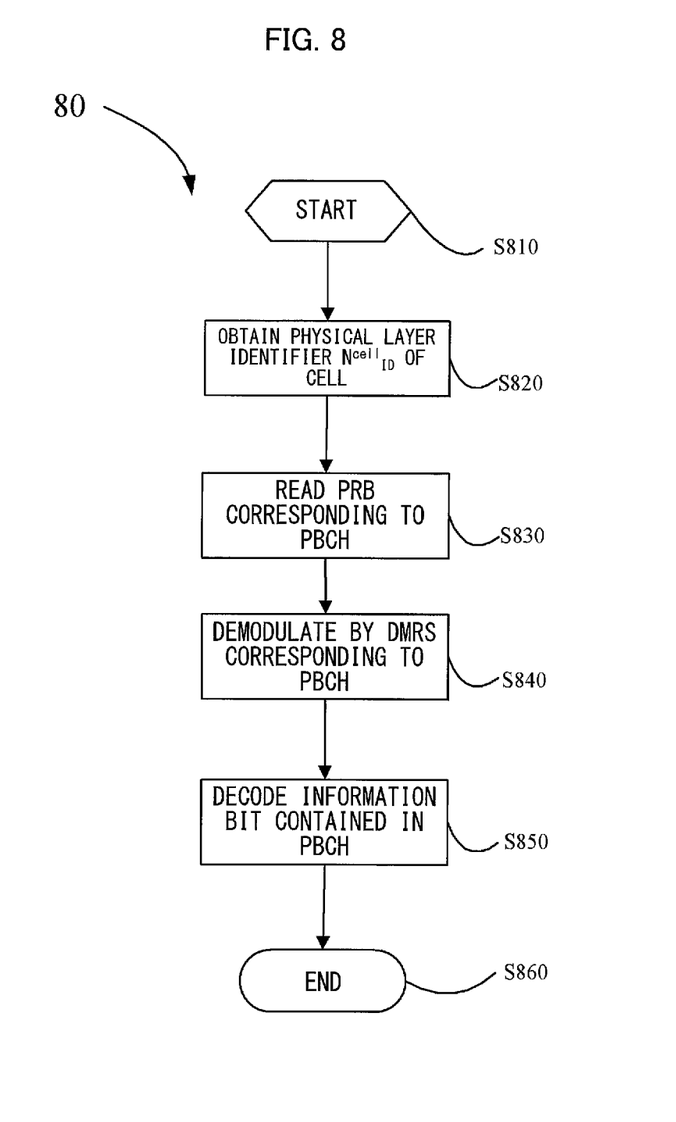
FIG. 8 is a flow chart illustrating a method in accordance with an example of the present invention, the method being carried out by a user equipment for reading PBCH.

FIG. 8 is a flow chart illustrating a method 80 in accordance with an example of the present invention, which method is employed by user equipment for reading PBCH. The method 80, for example, can be carried out by user equipment (UE) of the LTE system. As illustrated in FIG. 8, the method 80 is started from a step S810.

In a step S820, the user equipment obtains $$N_{ID}^{cell}$$ [Math. 23]

which is a physical layer identifier of a corresponding service cell.

In a step S830, a physical resource block PRB corresponding to a physical broadcast channel PBCH is read in accordance with the physical layer identifier $$N_{ID}^{cell}$$ [Math. 24]

thus obtained. According to the present invention, PRBs include a distributed PRB frequency division multiplexing format or a centralized PRB frequency division multiplexing format.

Specifically, in a case of PRBs of the distributed PRB frequency division multiplexing format, it is only necessary to read a PRB corresponding to the PBCH in accordance with the above-described Formula (1). For example, a serial number of a PRB for PBCH transmission is identified and read by use of a detection method. On the other hand, in a case of PRBs of the centralized PRB frequency division multiplexing format, it is only necessary to read a PRB corresponding to the PBCH in accordance with the above-described Formula (2). For example, a serial number of a PRB for PBCH transmission is identified and read by use of a detection method.

It is preferable to read 2 PRBs out of 6 PRBs located at a center part of a system frequency domain of a subframe. In addition, a resource element RE for PBCH is preferably different from (i) a RE for a PBCH demodulation reference signal, (ii) a RE for a sync signal, and (iii) a RE for a time/frequency tracking reference signal.

In a step S840, a PBCH sequence is obtained by demodulating, with the use of a demodulation reference signal DMRS, the PRB which has been read in the step S830. With respect to the centralized PRB frequency division multiplexing format, it is preferable to carry out the demodulation by use of a combination of DMRSs of differing PRBs. As described above, in a case where PBCH transmission is carried out by use of radiation diversity or random beam forming, it is possible to demodulate a RE resource of PBCH in accordance with (i) channel prediction in cases where a DMRS antenna port AP=7 and the AP=8 or (ii) channel prediction in cases where a DMRS antenna port AP=7, the AP=8, the AP=9, and the AP=10.

Next, in a step S850, bits contained in the PBCH sequence thus obtained by the demodulation are decoded, so that system information of a service cell is obtained. As described above, the system information contains a band, PHICH setting, and SFN.

Finally, the method 80 ends in a step S860.

Figure 9:
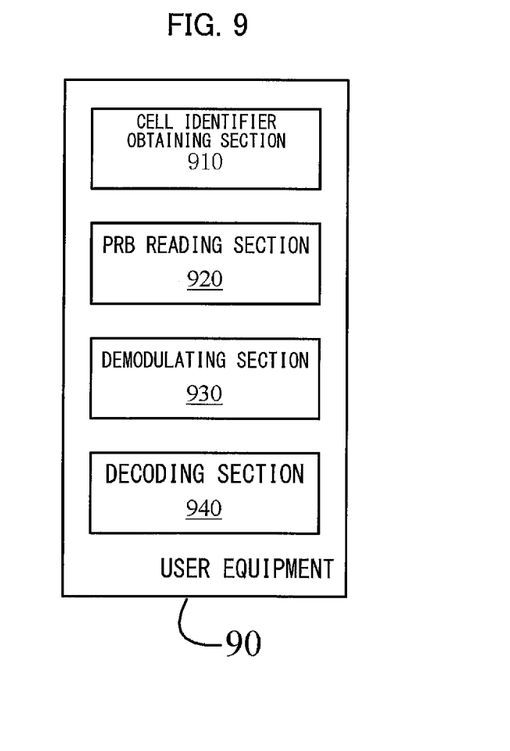
FIG. 9 is a block diagram illustrating a user equipment in accordance with an example of the present invention.

FIG. 9 is a block diagram illustrating a user equipment 90 in accordance with an example of the present invention. As illustrated in FIG. 9, the user equipment 90 includes a cell identifier obtaining section 910, a physical resource block PRB reading section 920, a demodulating section 930, and a decoding section 940. Each of the components of the user equipment 90 will be described in detail below.

The cell identifier obtaining section 910 is configured to obtain $$N_{ID}^{cell}$$ [Math. 25]

which is a physical layer identifier of a current service cell to which the user equipment 90 corresponds.

The physical resource block PRB reading section 920 is configured to read a PRB corresponding to a physical broadcast channel PBCH in accordance with the physical layer identifier $$N_{ID}^{cell}$$ [Math. 26]

thus obtained. According to the present invention, as described above, PRBs include a distributed PRB frequency division multiplexing format or a centralized PRB frequency division multiplexing format. The PRB reading section 920 preferably reads 2 PRBs out of 6 PRBs located at a center part of a system frequency domain of a subframe.

The demodulating section 930 is configured to obtain a PBCH sequence by carrying out demodulation by use of a demodulation reference signal DMRS. The demodulating section 930 preferably carries out the demodulation with respect to the centralized PRB frequency division multiplexing format by use of a combination of DMRSs of differing PRBs. In a case where PBCH transmission is carried out by use of radiation diversity or random beam forming, the demodulating section 930 can demodulate a RE resource of PBCH in accordance with (i) channel prediction in cases where a DMRS antenna port AP=7 and the AP=8 or (ii) channel prediction in cases where a DMRS antenna port AP=7, the AP=8, the AP=9, and the AP=10.

The decoding section 940 is configured to obtain, by decoding bits contained in a PBCH sequence, system information of a service cell, such as a system band, PHICH setting, and SFN.

According to a mechanism of transmitting and receiving system information of a service cell provided by the present invention, such a mechanism is realized that (i) a base station transmits the system information of the service cell and (ii) UE can obtain the system information. With the configuration of the present invention, it is possible to increase energy use efficiency of the LTE-Advanced system, improve spectral efficiency, and reduce inter-cell collision of time/frequency resources.

As can be understood by a person skilled in the art, the above examples of the present invention can each be realized by software, hardware, or a combination of software and hardware. For example, the base station and each of the components included in the user equipment can be realized by various devices. Examples of the devices encompass, but are not limited to, an analog circuit device, a digital circuit device, a digital signal processing (DSP) circuit, a programmable processor, an application specific integrated circuit (ASIC), a field-programmable gate array (FPGA), and a programmable logic device (CPLD).

According to the present invention, a "base station" (i) has relatively large radiative power and wide coverage area, (ii) refers to a switching center for controlling mobile communication data, and (iii) is equipped with functions such as scheduling of resource allocation and data transmission/reception. "User equipment" refers to a user mobile device. Examples of the user equipment encompass terminal devices for carrying out wireless communication with the base station or a femtocell, such as mobile phones and laptop computers.

Furthermore, the above-described examples of the present invention can be realized by a computer-programmed product. More specifically, the computer-programmed product refers to a product (i) which includes a computer-readable storage medium in which an encoded computer program logic is recorded and (ii) in which processing required for realizing the above-described configuration of the present invention is carried out by causing computer equipment to execute the computer program logic. In a case where at least one processor in a computer system executes the computer program logic, the processor executes the process (method) described in the examples of the present invention. Typical examples of the configuration of the present invention encompass: software, codes, and/or other data components recorded or encoded on computer-readable storage media such as an optical medium (e.g. CD-ROM), a floppy (registered trademark), or a hard disk; fixed elements on one or a plurality of ROM chips, RAM chips or PROM chips or other microcode-based media; and downloadable software images and shared databases in one or a plurality of modules. Furthermore, it is possible to provide a configuration such as the software and fixed element in computer equipment, and to cause one or a plurality of processors of the computer equipment to execute the technical construction described in the examples of the present invention.

Although the present invention has been thus described by illustrating preferable examples of the present invention, a person skilled in the art would understand that various modifications, replacements, and variations can be made to the present invention, provided that the spirit and the scope of the present invention are not exceeded. Therefore, the present invention is not limited to the above-described examples, but should be limited by the Claims of the present application and their equivalents.

The invention claimed is:

1. A method carried out by a user equipment, comprising the steps of:
   (a) obtaining a physical layer identifier of a service cell to which the user equipment corresponds;
   (b) reading, in accordance with the physical layer identifier thus obtained, a physical resource block PRB corresponding to a physical broadcast channel PBCH;
   (c) obtaining a PBCH sequence by carrying out demodulation with use of a demodulation reference signal DMRS; and
   (d) obtaining system information of a service cell by decoding a bit contained in the PBCH sequence,
   the PRB including a distributed PRB frequency division multiplexing format or a centralized PRB frequency division multiplexing format.

2. The method as set forth in claim 1, wherein the PRB corresponding to the PBCH includes 2 PRBs of 6 PRBs located at a center part of a system frequency domain of a subframe.

3. The method as set forth in claim 1, wherein
a resource element RE for the PBCH is different from each of a RE for a PBCH demodulation reference signal, a RE for a sync signal, and a RE for a time/frequency tracking reference signal.

4. The method as set forth in claim 1, wherein
the demodulating step includes a step of carrying out demodulation by use of a combination of DMRSs of differing PRBs with respect to the centralized PRB frequency division multiplexing format.

5. A user equipment comprising:
a cell identifier obtaining section configured to obtain a physical layer identifier of a current service cell to which the user equipment corresponds;
a physical resource block PRB reading section configured to read, in accordance with the physical layer identifier thus obtained, a PRB corresponding to a physical broadcast channel PBCH;
a demodulating section configured to obtain a PBCH sequence by carrying out demodulation with use of a demodulation reference signal DMRS; and
a decoding section configured to obtain system information of the service cell by decoding a bit contained in the PBCH sequence,
the PRB including a distributed PRB frequency division multiplexing format or a centralized PRB frequency division multiplexing format.

6. The user equipment as set forth in claim 5, wherein
the PRB reading section is configured to read 2 PRBs of 6 PRBs located at a center part of a system frequency domain of a subframe.

7. The user equipment as set forth in claim 5, wherein
the PRB reading section is configured to carry out reading with respect to a RE which is different from each of a RE for a PBCH demodulation reference signal, a RE for a sync signal, and a RE for a time/frequency tracking reference signal.

8. The user equipment as set forth in claim 5, wherein
the demodulating section is configured to carry out demodulation by use of a combination of DMRSs of differing PRBs with respect to the centralized PRB frequency division multiplexing format.

* * * * *